US009992532B1

(12) United States Patent
Cheng et al.

(10) Patent No.: US 9,992,532 B1
(45) Date of Patent: Jun. 5, 2018

(54) HAND-HELD ELECTRONIC APPARATUS, AUDIO VIDEO BROADCASTING APPARATUS AND BROADCASTING METHOD THEREOF

(71) Applicant: HTC Corporation, Taoyuan (TW)

(72) Inventors: Chih-Chiang Cheng, Taoyuan (TW); Chun-Min Lee, Taoyuan (TW); Hann-Shi Tong, Taoyuan (TW); Lei Chen, Taoyuan (TW); Chin-Kuo Huang, Taoyuan (TW); Hsiu-Po Yang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days. days.

(21) Appl. No.: 15/403,191

(22) Filed: Jan. 11, 2017

(51) Int. Cl.
| | |
|---|---|
| H04N 21/439 | (2011.01) |
| H04N 21/61 | (2011.01) |
| H04N 21/4223 | (2011.01) |
| H04N 21/44 | (2011.01) |

(52) U.S. Cl.
CPC ..... *H04N 21/4394* (2013.01); *H04N 21/4223* (2013.01); *H04N 21/44008* (2013.01); *H04N 21/6106* (2013.01)

(58) Field of Classification Search
CPC ........... H04N 21/4394; H04N 21/4223; H04N 21/44008; H04N 21/6106; H04N 5/2628; H04N 5/77; G06F 3/0482; G06F 3/04886; G06F 3/162; H04R 2430/20; H04R 2460/07; H04R 3/005; H04R 5/04
USPC ........ 725/116, 750, 753, 756, 758; 715/750, 715/753, 756, 758
See application file for complete search history.

(56) References Cited

U.S. PATENT DOCUMENTS

| | | | |
|---|---|---|---|
| 5,657,246 A | 8/1997 | Hogan et al. | |
| 6,795,106 B1 | 9/2004 | Cooper | |
| 7,565,680 B1 * | 7/2009 | Asmussen ............... | H04N 7/147 715/758 |
| 2001/0055059 A1 | 12/2001 | Satoda | |
| 2004/0001137 A1 | 1/2004 | Cutler et al. | |

(Continued)

OTHER PUBLICATIONS

"Office Action of Taiwan Counterpart Application," dated Sep. 25, 2017, p. 1-p. 12.

(Continued)

*Primary Examiner* — Nathan Flynn
*Assistant Examiner* — Cynthia Fogg
(74) *Attorney, Agent, or Firm* — JCIPRNET (57) ABSTRACT

An audio and video broadcasting apparatus includes a plurality of sound signal capturing devices, an image capturing device, a controller, and a speaker. The sound signal capturing devices capture a plurality of sound signals. The image capturing device obtains a display image. The controller is configured to: divide the display image into a plurality of display regions; establish a correspondence between the disposition positions and relative positions of the display regions; receive a playback setting command of a selected region, and set a playing weight of each of the display regions according to the playback setting command; and adjust a volume playback setting corresponding to the sound signals according to the playing weight of each of the display regions and the correspondence, and generate an output sound signal according to the volume playback setting and the sound signals. The speaker performs a sound playing action.

17 Claims, 8 Drawing Sheets

(56) References Cited

U.S. PATENT DOCUMENTS

| | | | |
|---|---|---|---|
| 2004/0008423 A1 | 1/2004 | Driscoll, Jr. et al. | |
| 2010/0020951 A1 | 1/2010 | Basart et al. | |
| 2011/0109798 A1* | 5/2011 | McReynolds | H04S 7/30 348/485 |
| 2012/0183162 A1* | 7/2012 | Chabanne | H04N 5/642 381/306 |
| 2014/0079225 A1* | 3/2014 | Jarske | H04R 29/00 381/56 |
| 2015/0139426 A1* | 5/2015 | Tammi | H04R 3/005 381/17 |
| 2015/0277707 A1* | 10/2015 | Dziuk | H04N 21/42224 715/716 |
| 2016/0080684 A1* | 3/2016 | Farrell | H04N 5/77 386/227 |
| 2016/0142830 A1* | 5/2016 | Hu | G02C 11/06 434/185 |
| 2016/0249134 A1* | 8/2016 | Wang | H04R 3/005 |
| 2016/0381459 A1* | 12/2016 | Baca | H04R 5/04 386/227 |

OTHER PUBLICATIONS

"Search Report of Europe Counterpart Application", dated Dec. 1, 2017, p. 1-p. 4.

\* cited by examiner

HAND-HELD ELECTRONIC APPARATUS, AUDIO VIDEO BROADCASTING APPARATUS AND BROADCASTING METHOD THEREOF

BACKGROUND OF THE INVENTION

1. Field of the Invention

The present invention generally relates to a hand-held electronic apparatus, an audio and video broadcasting apparatus thereof, and an audio and video playing method, in particular, to an audio and video broadcasting apparatus that plays sound according to position information in an image and an audio and video playing thereof.

2. Description of Related Art

With the progress of electronic technologies, a hand-held electronic apparatus becomes a dispensable tool in people's life. For example, in a conference, people often use a hand-held electronic apparatus to record sound, so as to record relevant content discussed in the conference. However, if only sound information is recorded, when conference content is listened to, it is possible that information expressed by cooperation of a body gesture cannot be completely understood, so that recording the sound information together with image information is a preferable choice.

However, in a same environment, multiple participants may make a sound simultaneously and discuss different subjects. Therefore, how to capture most effective information from the audio and video information recorded by the hand-held electronic apparatus is an important issue to those skilled in the art.

SUMMARY OF THE INVENTION

The present invention provides a hand-held electronic apparatus, an audio and video broadcasting apparatus, and an audio and video playing method thereof. A source and a volume of a sound signal playback can be controlled by selecting a specific target in a display image.

The audio and video broadcasting apparatus of the present invention includes a plurality of sound signal capturing devices, an image capturing device, a controller, and a speaker. The sound signal capturing devices are disposed at a plurality of disposition positions of the audio and video broadcasting apparatus and configured to capture a plurality of sound signals in an environment. The image capturing device captures an image in the environment to obtain a display image. The controller is coupled to the sound signal capturing devices and the image capturing device and configured to: divide the display image into a plurality of display regions; establish a correspondence between the disposition positions and relative positions of the display regions; receive a playback setting command corresponding to a selected region among the display regions, and set a playing weight of each of the display regions according to the playback setting command; and adjust a volume playback setting corresponding to the sound signals according to the playing weight of each of the display regions and the correspondence, and generate an output sound signal according to the volume playback setting and the sound signals. The speaker performs a sound playback action according to the output sound signal.

The hand-held electronic apparatus of the present invention includes a body and the audio and video broadcasting apparatus as stated above. The audio and video broadcasting apparatus is disposed inside the body, where the disposition positions of the sound signal capturing devices respectively correspond to a plurality of side surfaces of the body.

The audio and video playing method of the present invention includes: capturing a plurality of sound signals in an environment at a plurality of disposition positions of an audio and video broadcasting apparatus; dividing a display image into a plurality of display regions; establishing a correspondence between the disposition positions and relative positions of the display regions; receiving a playback setting command corresponding to a selected region among the display regions, and setting a playing weight of each of the display regions according to the playback setting command; adjusting a volume playback setting corresponding to the sound signals according to the playing weight of each of the display regions and the correspondence, and generating an output sound signal according to the volume playback setting and the sound signals; and performing a sound playback action according to the output sound signal.

On the basis of the above, by means of the audio and video broadcasting apparatus and the playing method thereof that are provided by the present invention, the audio and video broadcasting apparatus can perform an action of adjust of a sound playing position by means of an action of selecting a display image. In this way, an enhancement action is performed on a sound to be listened to and image information, and playback efficiency of the audio and video broadcasting apparatus is improved.

In order to make the foregoing features and advantages of the present invention comprehensible, embodiments accompanied with drawings are described in detail below.

DESCRIPTION OF THE EMBODIMENTS

Figure 1:
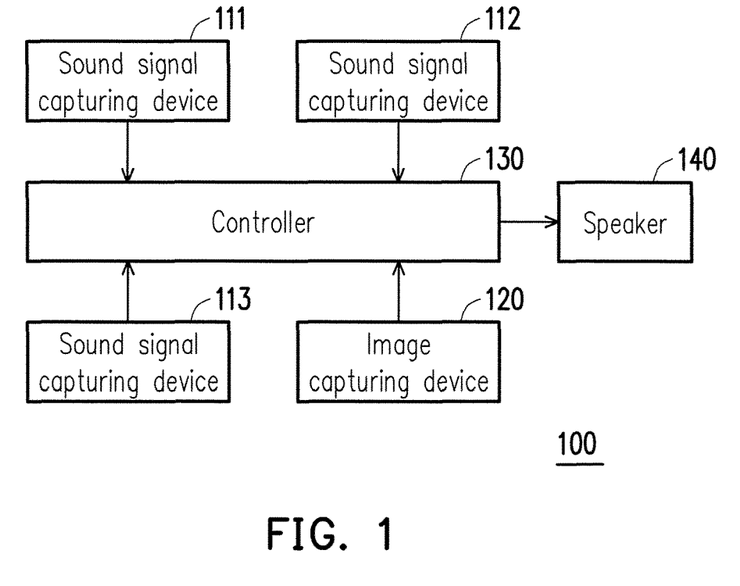
FIG. 1 shows a schematic diagram of an audio and video broadcasting apparatus according to an embodiment of the present invention.

Referring to FIG. 1, FIG. 1 shows a schematic diagram of an audio and video broadcasting apparatus according to an embodiment of the present invention. An audio and video broadcasting apparatus 100 includes sound signal capturing devices 111 to 113, an image capturing device 120, a controller 130, and a speaker 140. The sound signal capturing devices 111 to 113 are coupled to the controller 130. The sound signal capturing devices 111 to 113 may be respectively disposed at a plurality of different disposition positions of the audio and video broadcasting apparatus 100 and capture a plurality of sound signals in a same environment. The image capturing device 120 is coupled to the controller 120 and configured to capture an image in the environment to obtain a display image. The controller 130 receives the sound signals generated by the sound signal capturing devices 111 to 113 and the display image obtained by the image capturing device 120.

In addition, in this embodiment, the sound signal capturing devices 111 to 113 may be microphones or sound receiving devices well known to those of ordinary skill in the art. The image capturing device 120 may be any image receiving apparatus, such as cameras or photographing devices, well known to those of ordinary skill in the art.

Figure 2:
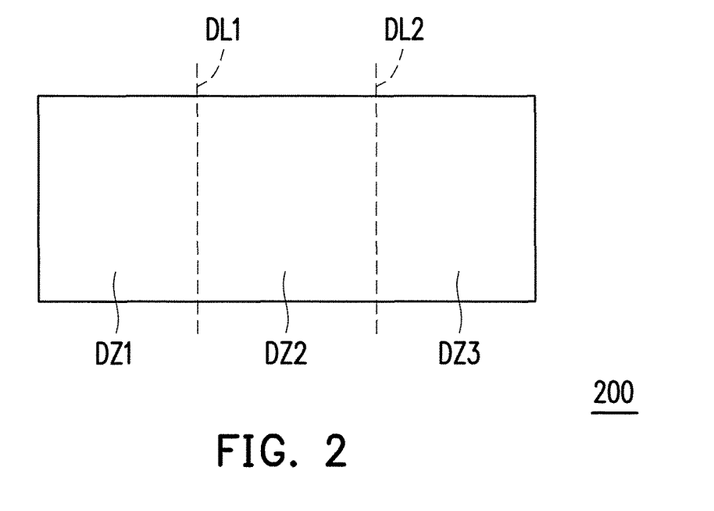
FIG. 2 shows a schematic diagram of a generation manner of a display region according to an embodiment of the present invention.

In terms of control of a sound playback action, the controller 130 divides the display image into a plurality of display regions. Referring to FIG. 1 and FIG. 2 simultaneously herein, FIG. 2 shows a schematic diagram of a generation manner of a display region according to an embodiment of the present invention. In FIG. 2, the controller 130 divides a display image 200 and divides the display image 200 into three display regions DZ1 to DZ3 by using division line segments DL1 and DL2. Sizes of the display regions DZ1 to DZ3 may be the same or may be different. In addition, in other embodiments of the present invention, the controller 130 may also divide the display image 200 into more than three or less than three display regions. Therefore, the divided display regions may also not need to be arranged in parallel to each other as shown in FIG. 2, and in different embodiments of the present invention, the display regions may be arranged in different manners, and there is no fixed limitation.

Figure 3:
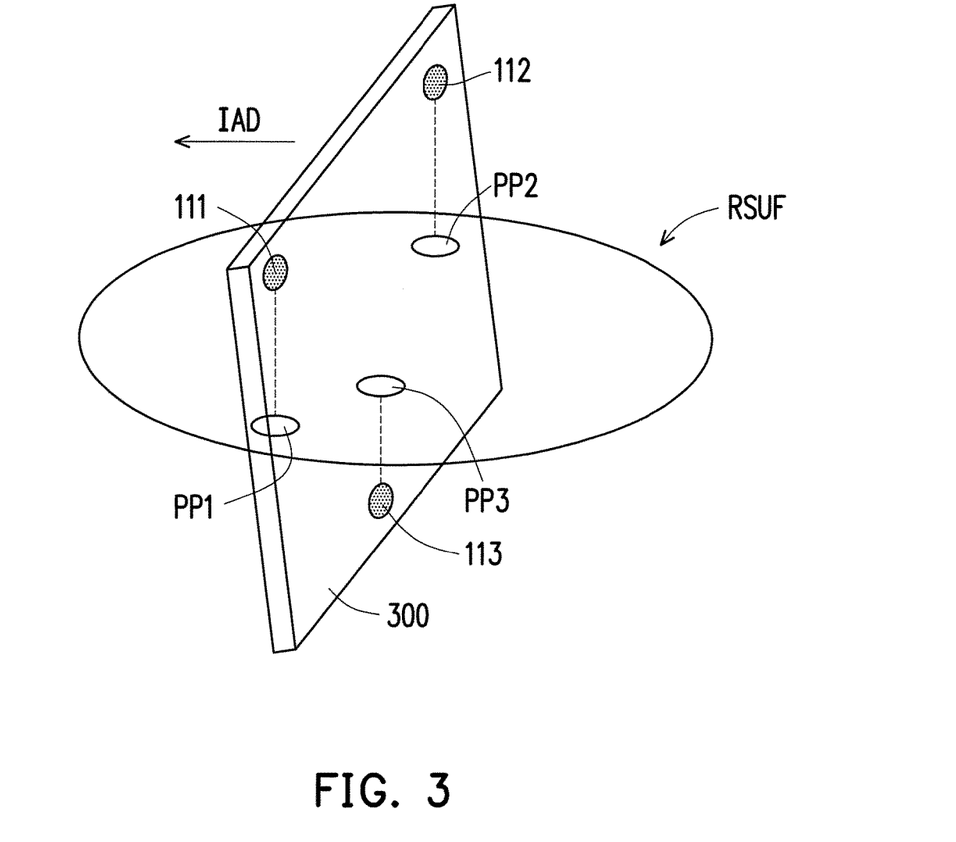
FIG. 3 shows a schematic diagram illustrating a relationship between a disposition position of a sound signal capturing device of a hand-held electronic apparatus and a reference plane according to an embodiment of the present invention.

Subsequently, the controller 130 establishes a correspondence between the disposition positions of the sound signal capturing devices 111 to 113 and relative positions of the display regions. Referring to FIG. 1 and FIG. 3 simultaneously herein, FIG. 3 shows a schematic diagram illustrating a relationship between a disposition position of a sound signal capturing device of a hand-held electronic apparatus and a reference plane according to an embodiment of the present invention. The hand-held electronic apparatus 300 is held vertically and performs an image capturing action according to an image capturing direction IAD. The audio and video broadcasting apparatus 100 may be disposed inside the body of the hand-held electronic apparatus 300, and the sound signal capturing devices 111 to 113 therein are disposed at different disposition positions on the body of the hand-held electronic apparatus 300. By means of setting a reference plane RSUF essentially parallel to the image capturing direction IAD, the sound signal capturing devices 111 to 113 may respectively project three projection positions PP1 to PP3 on the reference plane RSUF.

Figure 4A:
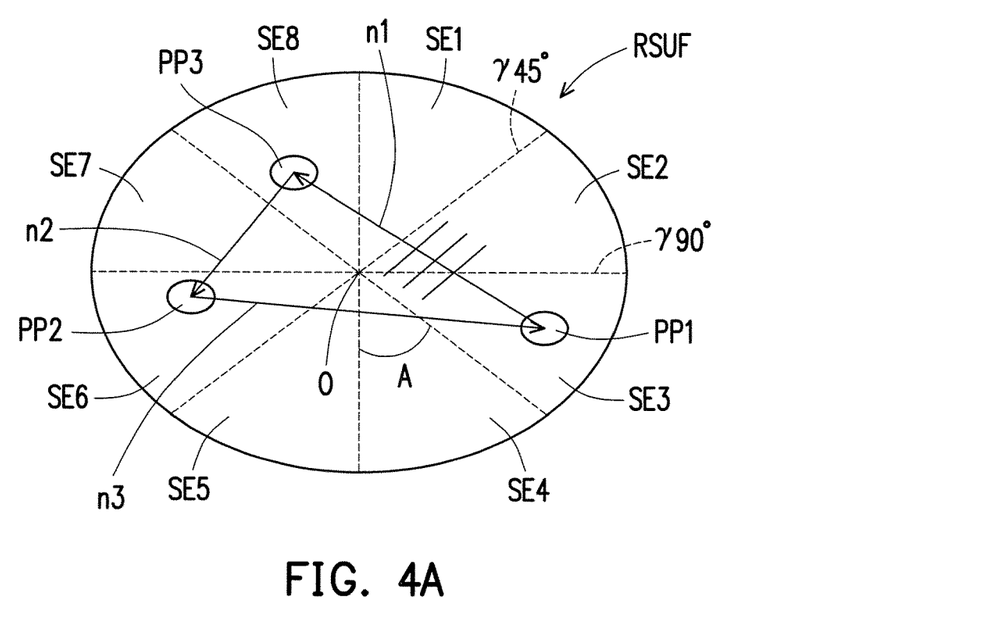
FIG. 4A shows a schematic diagram illustrating a position relationship between a projection position and a reference plane.
Figure 4B:
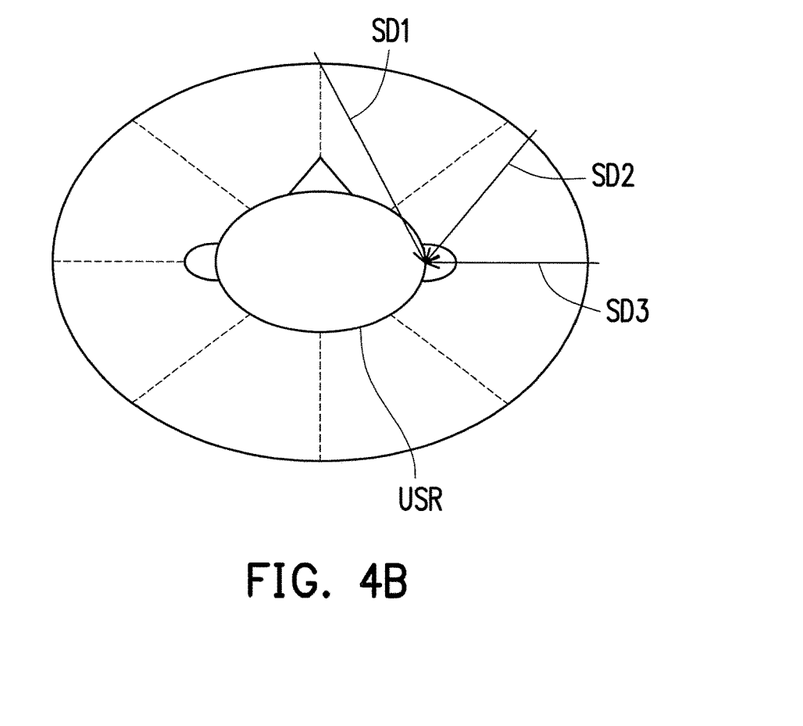
FIG. 4B shows a schematic diagram of selecting a direction to perform sound synthesis.

After obtaining projection positions PPI to PP3, referring FIG. 4A and FIG. 4B, FIG. 4A shows a schematic diagram illustrating a position relationship between a projection position and a reference plane, and FIG. 4B shows a schematic diagram of selecting a direction to perform sound synthesis. In FIG. 4A, the reference plane RSUF may be divided a plurality of vectors (for example, vectors 0°, 45°, 0° . . . ) into a plurality of sector regions SE1 to SE8, and each of the sector regions SE1 to SE8 is divided by using a preset central angle A according to the central point O of the reference plane RSUF. In the implementation manner of FIG. 4A, the central angle A equals 45 degrees.

Further, as shown in FIG. 4A, the plurality of sector regions SE1 to SE8 on the reference plane RSUF may correspond to the plurality of display regions in the display image. The display image 200 shown in FIG. 2 is used an example. Specifically, if the image capturing direction of the audio and video broadcasting apparatus is the same as the direction of the vector 0°, the sector regions SEI and SE8 correspond to the display regions DZ2, the sector regions SE1 and SE2 may correspond to the display region DZ3, and the sector region SE7 and SE8 may correspond to the display region DZ1. In this way, the controller 130 can effectively establish a correspondence between the disposition positions 111 to 113 and relative positions of the display regions DZ1 to DZ3.

Subsequently, in a process of performing an audio and video playback, the controller 130 may receive a playback setting command executed corresponding to the selected region in the display region, and set a playing weight of each display region according to the playback setting command. Referring to FIG. 2 and FIG. 4A simultaneously, according to the foregoing correspondence between the sector regions SE1 to SE8 and relative positions of the display region, if the display region DZ1 is set to be the selected region, a playing weight of the display region DZ1 is improved, and playing weights of the display regions DZ2 and DZ3 are lowered accordingly. Herein, a playing weight adjusting action is implemented by setting weights of the sector regions SE1 to SE8.

Figure 5A:
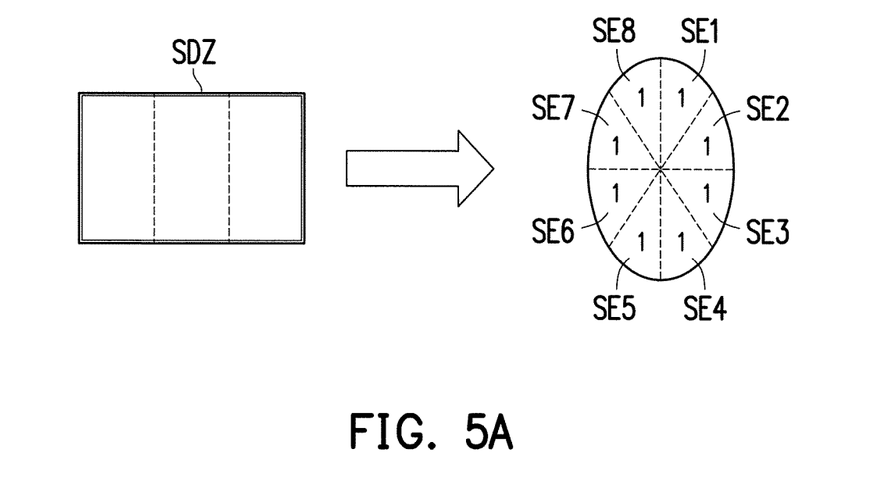
FIG. 5A to FIG. 5D respectively show diagrams illustrating a relationship between a selected region and a weighting setting of a sector region according to an embodiment of the present invention.
Figure 5B:
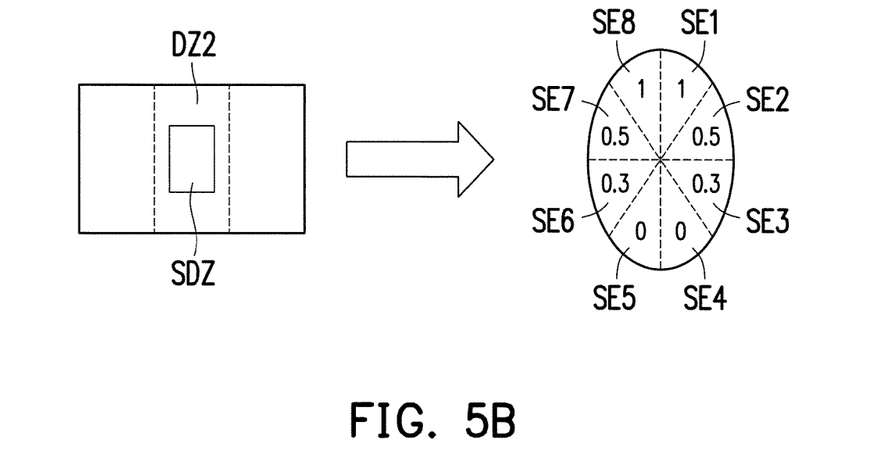

Hereinafter, referring to FIG. 5A to FIG. 5D, FIG. 5A to FIG. 5D respectively show diagrams illustrating a relationship between a selected region and a weighting setting of a sector region according to an embodiment of the present invention. In FIG. 5A, the whole display image is selected as a selected region SDZ, and at this time, all sector regions SE1 to SE8 are set to have a same weight 1. In FIG. 5B, the display region DZ2 at the center is set as the selected region SDZ, the sector regions SE1 and SE8 corresponding to the display region DZ2 are set have a relatively high weight 1, the sector regions SE2 and SE7 are set to have a relatively low weight 0.5, the sector regions SE3 and SE6 are set to have a relatively low weight 0.3, and the sector regions SE4 and SE5 are set have a lowest weight 0.

Figure 5C:
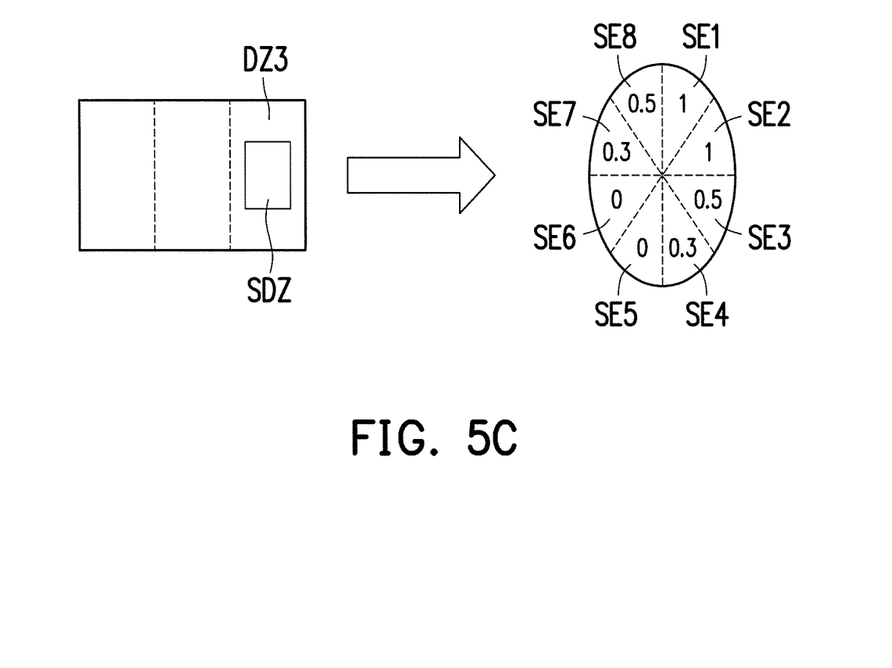

In addition, FIG. 5C, the display region DZ3 is set as the selected region SDZ, the sector regions SE1 and SE2 corresponding to the display region DZ3 are set have a relatively high weight 1, the sector regions SE8 and SE3 are set to have a relatively low weight 0.5, the sector regions SE7 and SE4 are set to have a relatively low weight 0.3, and the sector regions SE6 and SE5 are set have a lowest weight 0.

Figure 5D:
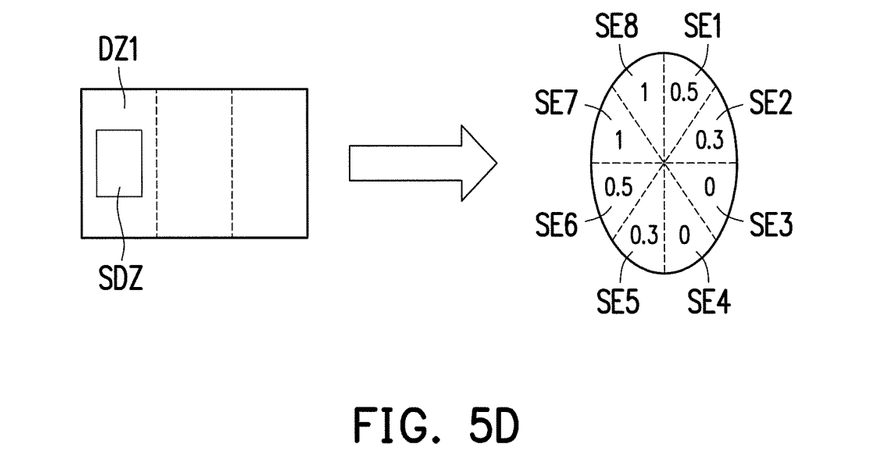

In FIG. 5D, the display region DZ1 is set as the selected region SDZ, herein, the sector regions SE7 and SE8 corresponding to the display region DZ1 are set have a relatively high weight 1, the sector regions SE6 and SE1 are set to have a relatively low weight 0.5, the sector regions SE5 and SE2 are set to have a relatively low weight 0.3, and the sector regions SE4 and SE3 are set have a lowest weight 0.

By means of the weights of the foregoing sector regions, sound signals received by sound signal capturing devices corresponding to the projection positions on the sector regions are adjusted and synthesized, an output sound signal can be obtained, and the speaker 140 is enabled to perform an action of playing the output sound signal.

With regard to the synthesis of sound signals, referring to FIG. 4A, in FIG. 4A, the projection positions PP1 to PP3 respectively fall within in the sector regions SE3, SE6, and SE8. To perform sound analysis on a horizontal 360° space, at least three sound signal capturing devices are needed to record sounds, and sound transmission directions, n1, n2, and n3 of the sound signal capturing devices 111 to 113 can be defined according to projection positions PP1 to PP3 of the three sound signal capturing devices 111 to 113 on the reference plane RSUF. Further, a combined sound of each direction can be calculated by using a plane sound wave propagation theory, as shown in a mathematical equation (1):

$$P_y = \sum_{x=1}^{3} P_x \cdot e^{j\frac{\omega}{C} n x \cdot \gamma y}, y = 0°, 45° \quad (1)$$

P1, P2, and P3 are respectively coordinates of the projection positions PP1 to PP3 and the reference plane RSUF, ω is a frequency of a sound signal, and C is a sound velocity.

Sounds in directions selected by a user may be synthesized into an output binaural sound signal according to a psychological acoustical model or a relevant model (a head-related transfer function (HRTF)). The psychological acoustical model or relevant model is used to describe responses to sounds in different directions that are transmitted to human ears, even for a same sound source, a hearing difference between two ears is caused by physical factors, such as a facial contour, sounds are recorded by using microphones in ears of a manikin head, and in a case of a controllable single sound source, a transfer function between the two can be mathematically expressed, thus responses of human ears to sounds in different directions can be emulated.

As shown in FIG. 4B, a sound wave heard by the right ear of a user USR may be obtained by synthesizing sound waves SD1 to SD3 in different directions.

Figure 6:
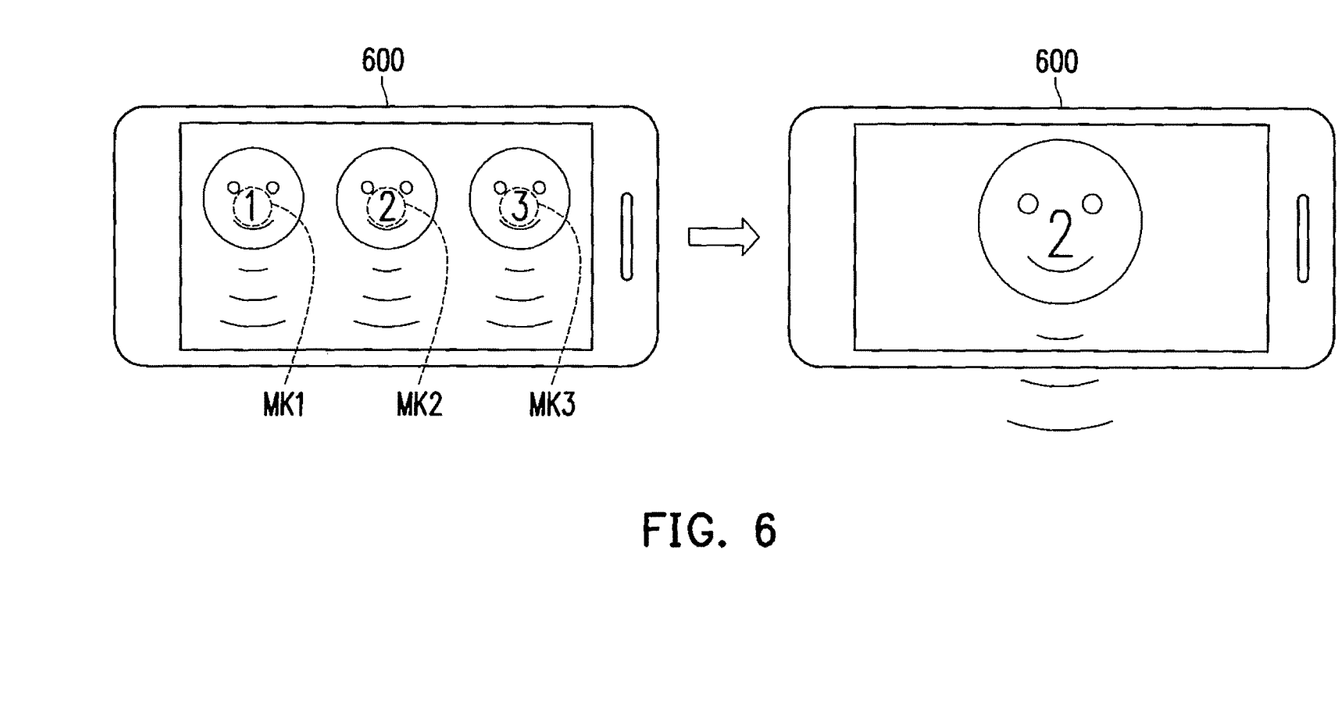
FIG. 6 shows a schematic diagram of an image adjusting manner according to an embodiment of the present invention.

Subsequently, referring to FIG. 6, FIG. 6 shows a schematic diagram of an image adjusting manner according to an embodiment of the present invention. An audio and video broadcasting apparatus 100 is disposed in a hand-held electronic apparatus 600. The controller 130 may perform processing directed to a display image by means of a face recognition action and displays marks MK1 to MK3 in the display image as operation interfaces. When a user wants to choose to listen to voice made by one speaker in the display image, the user may choose a mark (for example, a mark MK2). Hence, the hand-held electronic apparatus 600 may enlarge and display the mark MK2 corresponding to the image of the user and accordingly, amplify a sound that is made by a user corresponding to the mark MK2 and that is captured by a sound capturing device.

In terms of detail, the controller 130 may recognize a plurality of persons in the display image by means of a facial recognition action, add numbers to the recognized persons, and display the numbers in the display image as operation interfaces. By means of the operation interface, a user may receive speech content of a corresponding person by selecting a number. Herein, the volume of the speech content of the selected person may be turned up, and the volume of speech content of an unselected person may be turned down or even silenced.

However, implementation of the foregoing manner of generating an operation interface is not limited to using a face recognition action. In embodiments of the present invention, the generation may be implemented by using technologies, such as object recognition and gesture recognition, well known to those of ordinary skill in the art. In terms of object recognition, for example, the controller 130 may perform recognition directed to an object (for example, objects of a same type of different types, such as vehicles and electrical appliances) in the display image and provide operation interfaces for a user to select an object of one of the operation interfaces to read a sound signal thereof. With regard to the gesture recognition, the controller 130 may perform recognition by recognizing whether a person in the display image makes a special gesture, add marks (numbers), and further, provide the numbers to establish operation interface for a user to receive speech content of a corresponding person by selecting a number by means of the operation interface.

In addition, when the hand-held electronic apparatus 600 enlarges and displays an image of a user corresponding to the mark MK2, a user may enable, by means of an instruction, the hand-held electronic apparatus 600 to recover the display image or change to enlarge and display an image of a user corresponding to the mark MK1 and simultaneously adjust the played output sound signal.

Figure 7A:
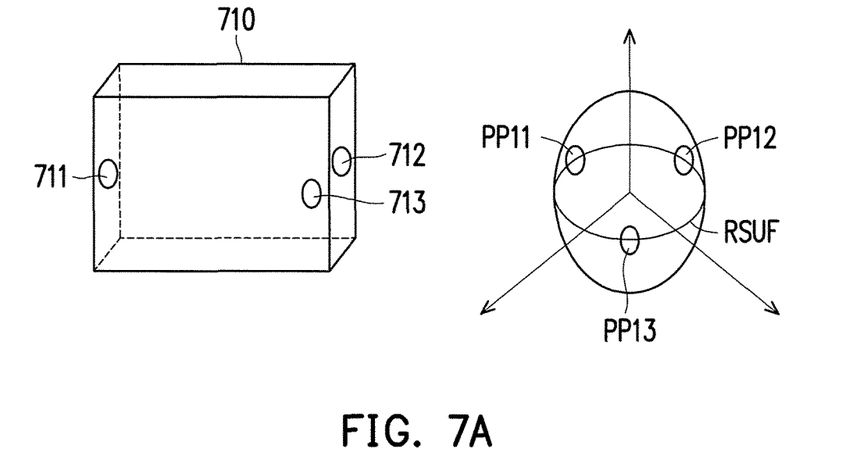
FIG. 7A and FIG. 7B respectively show schematic diagrams of disposition positions of sound capturing devices according to different implementation manners of the present invention.

Hereinafter, referring to FIG. 7A and FIG. 7B, FIG. 7A and FIG. 7B respectively show schematic diagrams of disposition positions of sound capturing devices according to different implementation manners of the present invention. In FIG. 7A, a hand-held electronic apparatus 710 includes three sound signal capturing devices 711 to 713, respectively disposed on different sides of the hand-held electronic apparatus 710. The sound signal capturing devices 711 to 713 are respectively projected to projection positions PP11 to PP13 of a reference plane RSUF, where the projection positions PP11 to PP13 are evenly distributed at different positions of the reference plane RSUF.

Figure 7B:
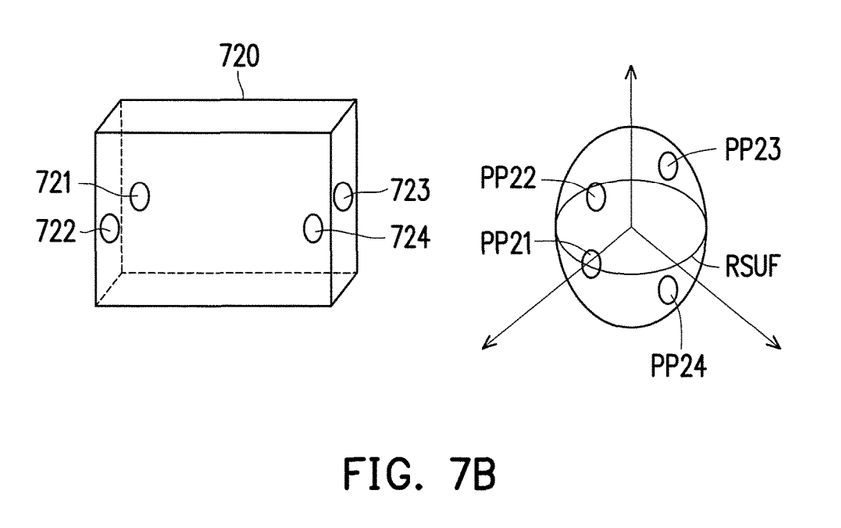

In FIG. 7B, a hand-held electronic apparatus 720 includes four sound signal capturing devices 721 to 724, respectively disposed on different sides of the hand-held electronic apparatus 720. The sound signal capturing devices 721 to 724 are respectively projected to projection positions PP21 to PP24 of a reference plane RSUF, where the projection positions PP21 to PP24 may also be evenly distributed at different positions of the reference plane RSUF.

Herein, in the embodiments of the present invention, the number of sound signal capturing devices is not specifically limited.

Figure 8:
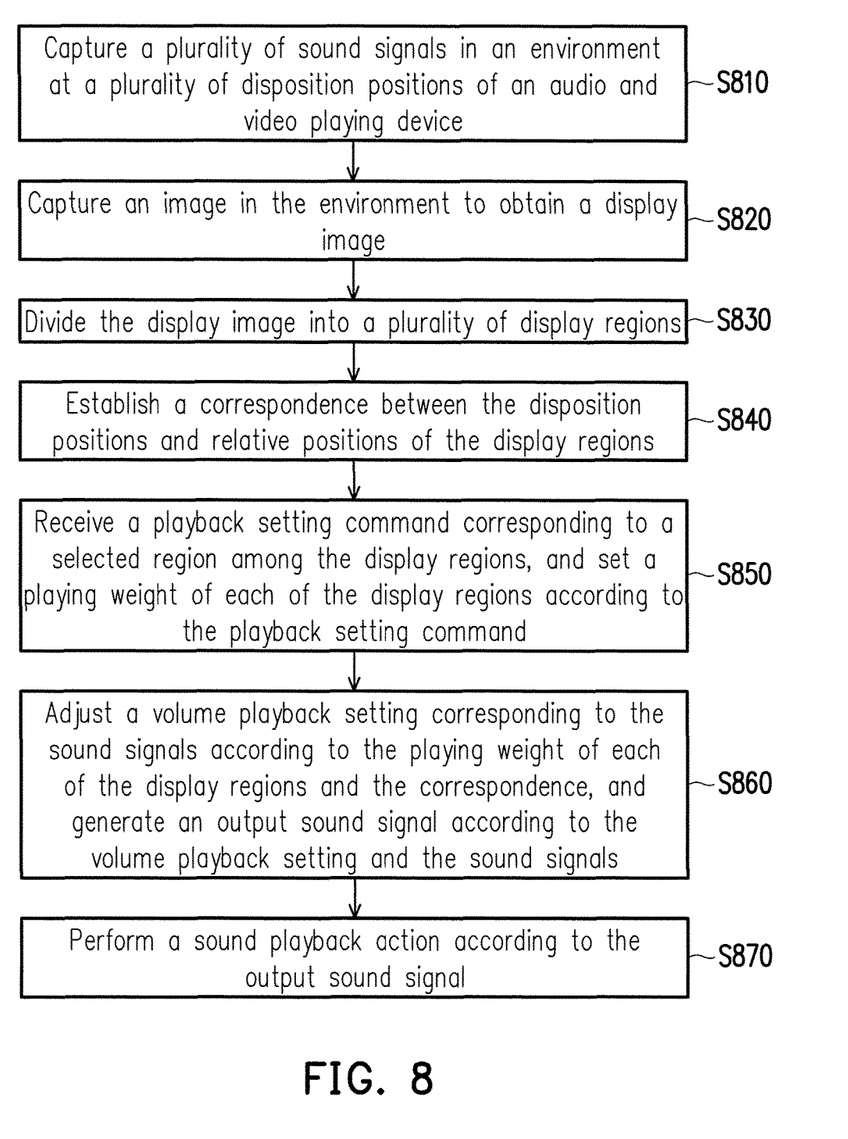
FIG. 8 shows a flowchart of an audio and video playing method according to an embodiment of the present invention.

Referring to FIG. 8, FIG. 8 shows a flowchart of an audio and video playing method according to an embodiment of the present invention. The audio and video playing method includes: step S810, capturing a plurality of sound signals in an environment at a plurality of disposition positions of an audio and video broadcasting apparatus; step S820, capturing an image in the environment to obtain a display image; step S830, dividing a display image into a plurality of display regions; step S840, establishing a correspondence between the disposition positions and relative positions of the display regions; step S850, receiving a playback setting command corresponding to a selected region among the display regions, and setting a playing weight of each of the display regions according to the playback setting command; step S860, adjusting a volume playback setting corresponding to the sound signals according to the playing weight of each of the display regions and the correspondence, and generating an output sound signal according to the volume playback setting and the sound signals; and step S870, performing a sound playback action according to the output sound signal.

With regard to multiple implementation details of the foregoing steps, detailed descriptions are made in the foregoing multiple embodiments and implementation manners, and the detailed descriptions thereof are omitted.

In conclusion, in the present invention, the display image is divided into a plurality of display regions, and a correspondence between relative positions are established for the display regions and disposition positions of sound signal capturing devices. In addition, when an audio and video playback is performed, by selecting a display region, an audio and video broadcasting apparatus can enhance a sound signal captured by a sound signal capturing device corresponding to the selected region and perform a sound playing action. In this way, a user can obtain a sound signal to be received more clearly, and use efficiency of the audio and video broadcasting apparatus is improved.

Although embodiments of the present invention are disclosed as above, they are not intended to limit the present invention. Any person of ordinary skill in the art may make some variations or modifications without departing from the spirit and scope of the present invention. Therefore, the protection scope of the present invention shall be subject to the protection scope of the appended claims.

What is claimed is:

1. An audio and video broadcasting apparatus, comprising:
   a plurality of sound signal capturing devices, disposed at a plurality of disposition positions of the audio and video broadcasting apparatus and configured to respectively capture a plurality of sound signals in an environment;
   an image capturing device, which captures an image in the environment to obtain a display image;
   a controller, coupled to the sound signal capturing devices and the image capturing device and configured to:
   divide the display image into a plurality of display regions;
   set a reference plane according to an image capturing direction of the image capturing device, and divide the reference plane into a plurality of sector regions with a sound receiving point on the reference plane as a central point according to different angles based on the central point;
   calculate a plurality of projection positions of the sound signal capturing devices on the reference plane according to the disposition positions, and generate a correspondence between the disposition positions and relative positions of the display regions according to each of the sector regions corresponding to each of the projection positions;
   receive a playback setting command corresponding to a selected region among the display regions, and set a playing weight of each of the display regions according to the playback setting command; and
   adjust a volume playback setting corresponding to the sound signals according to the playing weight of each of the display regions and the correspondence, and generate an output sound signal according to the volume playback setting and the sound signals; and
   a speaker, which performs a sound playback action according to the output sound signal.

2. The audio and video broadcasting apparatus according to claim 1, wherein the controller performs a sound signal conversion action directed to the sound signal according to the playing weight and the projection positions and generates the output sound signal of stereo sound.

3. The audio and video broadcasting apparatus according to claim 1, wherein the controller performs the sound signal conversion action according to a head-related transfer function.

4. The audio and video broadcasting apparatus according to claim 1, wherein the controller makes, according to the playback setting command, a playing weight of the selected region improved and playing weights of the display regions that are not the selected region lowered.

5. The audio and video broadcasting apparatus according to claim 1, further comprising:
   an image display, configured to display the display image, wherein:
   the controller enables, according to the playback setting command, the image display to perform an enlarged display action on the selected region.

6. The audio and video broadcasting apparatus according to claim 5, wherein when the selected region changes from a first display region to a second display region, the image display changes to perform a display action of enlarging a second display region.

7. The audio and video broadcasting apparatus according to claim 5, wherein the image display is further configured to display an operation interface, wherein:
   the operation interface is configured to receive the playback setting command.

8. The audio and video broadcasting apparatus according to claim 7, wherein the controller performs a characteristic identification action directed to the display image to generate the operation interface.

9. A hand-held electronic apparatus, comprising:
   a body; and
   the audio and video broadcasting apparatus according to claim 1, disposed inside the body, wherein:
   the disposition positions of the sound signal capturing devices respectively correspond to a plurality of side surfaces of the body.

10. An audio and video broadcasting method, comprising:
    capturing a plurality of sound signals in an environment at a plurality of disposition positions of an audio and video broadcasting apparatus;
    capturing an image in the environment to obtain a display image;
    dividing the display image into a plurality of display regions;
    setting a reference plane according to an image capturing direction of the image capturing device, and dividing the reference plane into a plurality of sector regions with a sound receiving point on the reference plane as a central point according to different angles based on the central point;
    calculating a plurality of projection positions of the sound signal capturing devices on the reference plane according to the disposition positions, and generating a correspondence between the disposition positions and relative positions of the display regions according to each of the sector regions corresponding to each of the projection positions;

receiving a playback setting command corresponding to a selected region among the display regions, and setting a playing weight of each of the display regions according to the playback setting command;

adjusting a volume playback setting corresponding to the sound signals according to the playing weight of each of the display regions and the correspondence, and generating an output sound signal according to the volume playback setting and the sound signals; and performing a sound playback action according to the output sound signal.

11. The audio and video broadcasting method according to claim 10, wherein step of adjusting the volume playback setting corresponding to the sound signals according to the playing weight of each of the display regions and the correspondence, and generating an output sound signal according to the volume playback setting and the sound signals comprises:

performing a sound signal conversion action directed to the sound signal according to the playing weight and the projection positions and generating the output sound signal of stereo sound.

12. The audio and video broadcasting method according to claim 11, wherein step of performing the sound signal conversion action directed to the sound signal and generating the output sound signal of stereo sound comprises:

performing the sound signal conversion action according to a head-related transfer function to generate the output sound signal of stereo sound.

13. The audio and video broadcasting method according to claim 10, wherein step of receiving the playback setting command corresponding to the selected region among the display regions, and setting the playing weight of each of the display regions according to the playback setting command comprises:

making, according to the playback setting command, a playing weight of the selected region improved and playing weights of the display regions that are not the selected region lowered.

14. The audio and video broadcasting method according to claim 10, further comprising:

providing an image display, configured to display the display image; and enabling, according to the playback setting command, the image display to perform an enlarged display action on the selected region.

15. The audio and video broadcasting method according to claim 14, further comprising:

when the selected region changes from a first display region to a second display region, enabling the image display to change to perform a display action of enlarging a second display region.

16. The audio and video broadcasting method according to claim 10, further comprising:

providing the image display to display an operation interface, wherein the operation interface is configured to receive the playback setting command.

17. The audio and video broadcasting method according to claim 16, further comprising:

performing a characteristic identification action directed to the display image to generate the operation interface.

* * * * *